United States Patent [19]

Narita et al.

[11] Patent Number: 5,405,075
[45] Date of Patent: Apr. 11, 1995

US005405075A

[54] WELDING APPARATUS AND AN OPERATION METHOD THEREOF

[75] Inventors: Hideo Narita, Lexington, Ky.; Yoshitaka Sakamoto, Lichifield, United Kingdom; Hisanori Nakamura, Toyota, Japan; Yoichi Shibata, Toyota, Japan; Hiedaki Tobita, Toyota, Japan

[73] Assignee: Toyota Jidosha Kabushiki Kaisha, Toyota, Japan

[21] Appl. No.: 124,207

[22] Filed: Sep. 21, 1993

[51] Int. Cl.$^6$ .............................................. B23K 37/02
[52] U.S. Cl. .................................... 228/102; 228/8; 219/91.1
[58] Field of Search ................. 228/102, 103, 8; 219/91.1

[56] References Cited

U.S. PATENT DOCUMENTS

| | | |
|---|---|---|
| 4,678,887 | 7/1987 | Nagel et al. ............... 219/117.1 |
| 5,221,037 | 6/1993 | Terakado et al. ............ 228/8 |

FOREIGN PATENT DOCUMENTS

| | | |
|---|---|---|
| 2025694 | 3/1991 | Canada . |
| 299519A5 | 4/1992 | German Dem. Rep. ........... 228/102 |
| 60-174285 | 1/1986 | Japan . |
| 63-199086 | 8/1988 | Japan . |
| 1215472 | 2/1989 | Japan . |
| 3207580 | 9/1991 | Japan . |
| 2261081 | 5/1993 | United Kingdom . |

OTHER PUBLICATIONS

Heiss, H., "Grundlagen der Koordinatentransformation bei Industrierobotern", Robotersysteme, vol. 2, No. 2, 1986, pp. 65–71.

Patent Abstracts of Japan, vol. 010, No. 014, Jan. 1986, Toyota Jidosha K.K.

*Primary Examiner*—P. Austin Bradley
*Assistant Examiner*—Jeffrey T. Knapp
*Attorney, Agent, or Firm*—Cushman, Darby & Cushman

[57] ABSTRACT

When a welding tip is moved from one welding point to a successive welding point, a robot and a welding gun are operated simultaneously with each other during a first time period between an issue of a pressurizing start signal and finish of the pressurizing, and again during a second time period between an issue of a depressurization signal and finish of the depressurization so that a pressurization time period $t_1$ and a depressurization time period $t_2$ are eliminated from a welding cycle time and the welding cycle time is shortened. A welding gun which includes a servo motor and a ball screw for converting a rotation of the servo motor to a stroke of the welding tip is used, and the stroke of the welding tip is counted as one axis of the robot, and the welding tip motion is controlled by a robot controller.

9 Claims, 5 Drawing Sheets

WELDING APPARATUS AND AN OPERATION METHOD THEREOF

BACKGROUND OF THE INVENTION

1. Field of the Invention

The present invention relates to a welding apparatus which can shorten a time period needed for moving a welding tip from a weld point to a successive weld point and an operation method thereof.

2. Description of the Related Art

Figure 5:
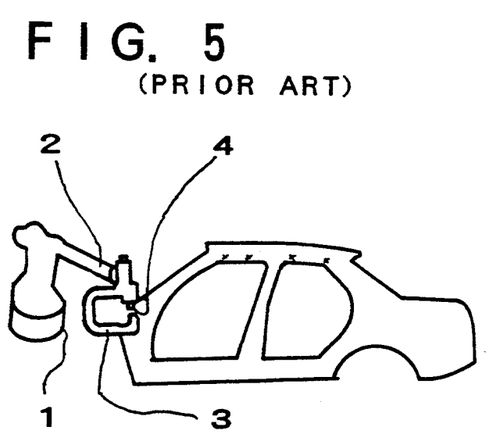
FIG. 5 is a schematic side view of a conventional robot welding apparatus and a workpiece to be welded.
Figure 6:
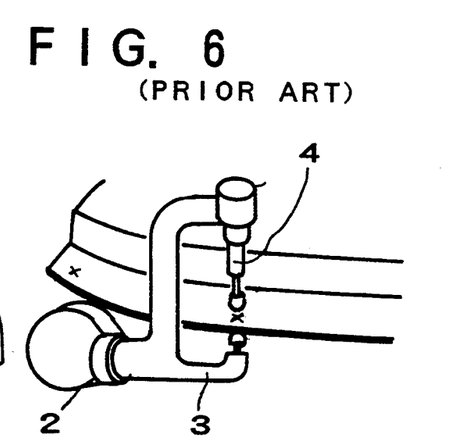
FIG. 6 is an enlarged oblique view of a welding gun of the apparatus of FIG. 5.

As illustrated in FIGS. 5 and 6, a conventional spot welding apparatus has a general purpose robot 1 and a welding gun 3 mounted to a wrist 2 of the robot 1. In the welding apparatus, the welding gun has a welding tip 4 which is driven by an air cylinder.

Figure 7:
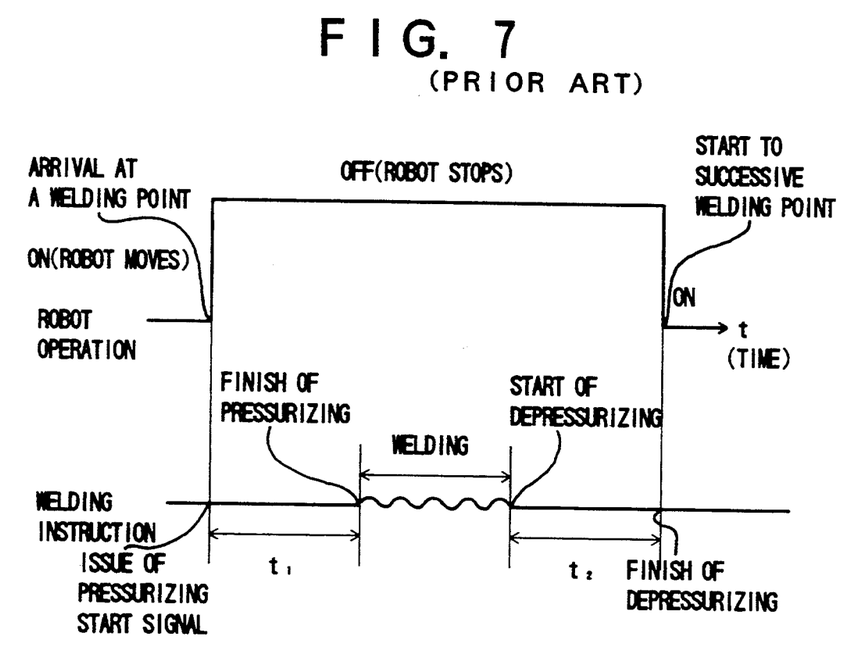
FIG. 7 is a chart showing a time schedule of operation of the conventional welding apparatus of FIG. 5.

The robot 1 and the welding gun 3 are operated according to an operation timing schedule shown in FIG. 7. More particularly, when or after the welding gun has reached a position corresponding to a welding point, a pressurizing start instruction is issued and the pressurizing motion continues for a time period $t_1$. After pressurizing, welding starts by applying an electric current to the welding tip. After terminating the electric current, a depressurization start instruction is issued and the depressurization continues for a time period $t_2$. When or after depressurization has finished, the welding gun moves toward the successive welding point driven by the robot.

However, the pressurizing time period $t_1$ and the pressurizing release time period $t_2$ lengthen the welding cycle time.

SUMMARY OF THE INVENTION

An object of the invention is to provide a welding apparatus and an operation method thereof wherein a welding cycle time is not lengthened by the pressurization and depressurization processes so that welding cycle time is shortened compared with the above-described conventional welding method.

BRIEF DESCRIPTION OF THE DRAWINGS

The above and other objects, features, and advantages of the present invention will become more apparent and will be more readily appreciated from the following detailed description of the preferred embodiments of the invention taken in conjunction with the accompanying drawings, in which.

DETAILED DESCRIPTION OF THE PREFERRED EMBODIMENT

Figure 1:
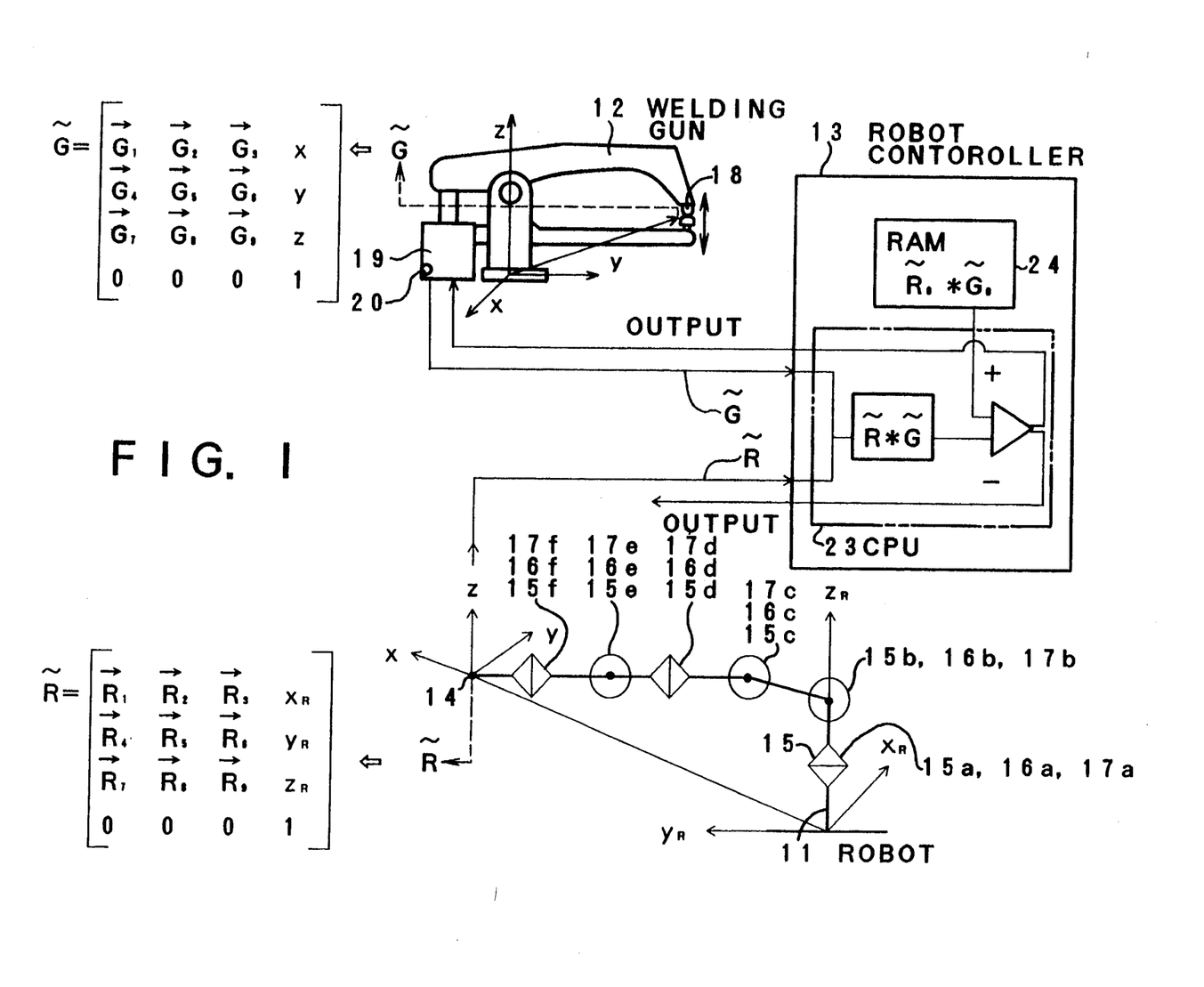
FIG. 1 is a system diagram of a welding apparatus in accordance with one embodiment of the present invention.

As illustrated in FIG. 1, a welding apparatus in accordance with one embodiment of the present invention generally includes a robot 11, a welding gun 12, and a robot controller 13.

The robot 11 has a welding gun mounting surface (hereinafter, a gun mounting surface) 14 at its tip (wrist), and the welding gun 12 is mounted to the robot 11 at the gun mounting surface 14. In order that the gun mounting surface 14 may achieve an arbitrary position and slope (hereinafter, position) throughout a fixed three-dimensional coordinate system, the robot 11 must have six degrees of freedom (x, y, z, $\theta_x$, $\theta_y$, $\theta_z$). The robot 11 comprises six arms are connected in series by six articulations (rotatable joints) 15. Each articulation 15a, 15b, 15c, 15d, 15e, 15f has an actuator 16 (16a, 16b, 16c, 16d, 16e, 16f) for rotating the articulation and a position sensor 17 (17a, 17b, 17c, 17d, 17e, 17f) for detecting a rotation amount. The actuator 16 comprises, for example, a servo motor, and the position sensor 17 comprises, for example, an encoder coupled to the servo motor.

Figure 3:
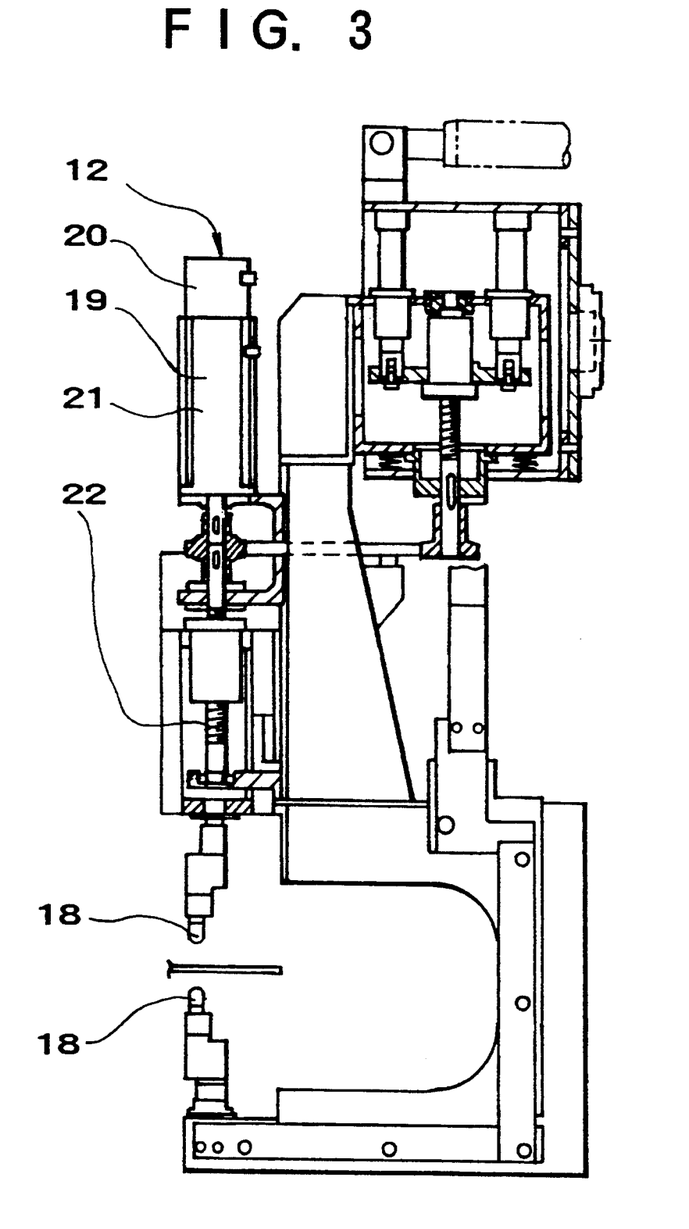
FIG. 3 is a cross-sectional view of a welding gun of the apparatus of FIG. 1.
Figure 4:
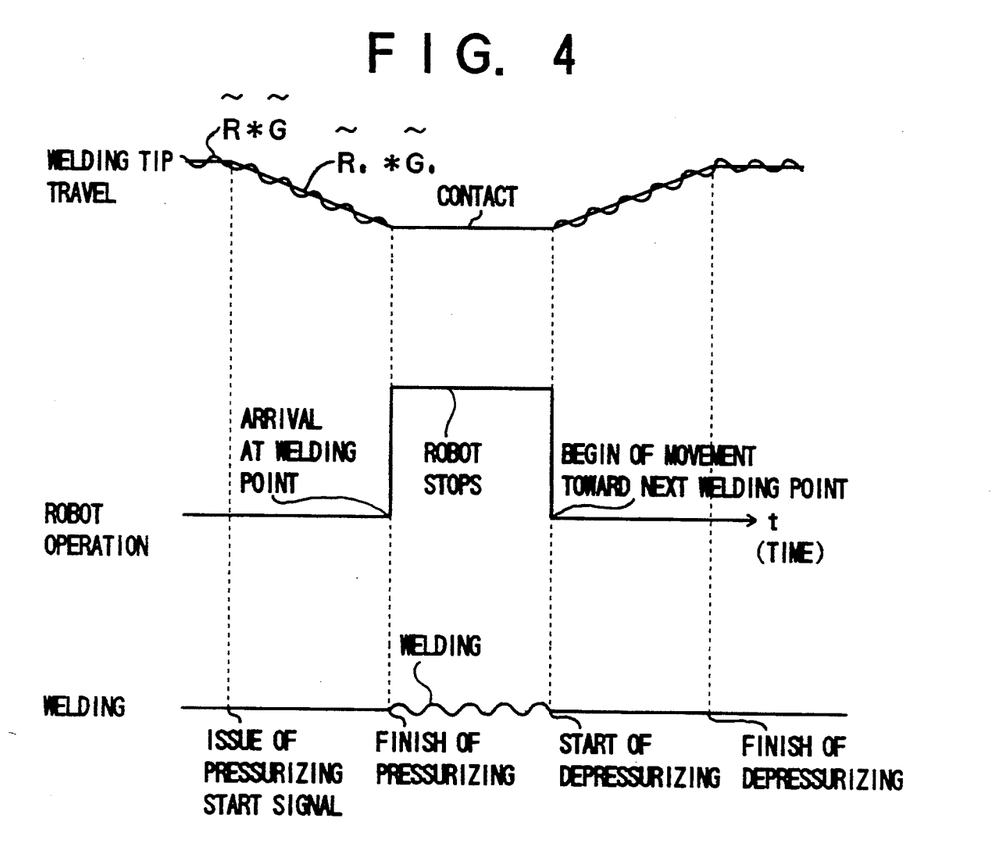
FIG. 4 is a chart showing a time schedule of operation of the welding apparatus of FIG. 1.

As illustrated in FIG. 3, the welding gun 12 has a gun body, a welding tip (a gun tip) 18 movable relative to the gun body, a welding gun actuator (hereinafter, a gun actuator) 19 for driving the welding tip 18 in one direction relative to the gun body, and a welding tip position sensor (hereinafter, a tip position sensor) 20 for detecting a position of the welding tip 18 relative to the gun body. The gun actuator 19 has a servo motor 21 and a ball screw 22 for converting a rotation of a shaft of the servo motor 21 to a stroke motion of the welding tip 18 in one direction. The tip position sensor 20 comprises an encoder coupled to the servo motor 21. Thus, unlike a conventional air cylinder-type gun actuator, the gun actuator 19 of welding gun 12 of the invention can drive the welding tip 18 to an arbitrary position relative to the gun body in one direction, and the relative position can be detected by the tip position sensor 20.

The robot controller 13 comprises a computer and is electrically connected to the actuators 16 and the position sensors 17 of the robot 11 and to the gun actuator 19 and the tip position sensor 20 of the welding gun 12. The robot controller 13 has a CPU (central processor unit) 23 for conducting calculations and a RAM (random access memory) 24 for temporarily storing data. The CPU 23 uses sensor information to calculate a current position R*G of the welding tip 18 in a fixed space defined by a three dimensional coordinate system having its origin at a robot base end. The CPU 23 then compares the calculated position R*G with a predetermined trajectory $R_0$*$G_0$ from a first welding point to a successive welding point, and calculates a deviation which is fed to the robot actuators 16 and the gun actuators 19. The RAM 24 stores the coordinates of the predetermined trajectory $R_0$*$G_0$ for the welding tip 18. The coordinates of the trajectory $R_0$*$G_0$ are predetermined such that the robot 11 and the welding gun 12 are operated synchronously or simultaneously with each other during a pressurization and depressurization. Even if the pressurizing start signal is issued, the welding tip 18 does not begin to pressurize a workpiece to be spot-welded before the welding tip 18 is lowered to contact the workpiece. In other time periods, the welding tip 18 is driven only by the robot 11 which a) calculates a current position R of the welding tip 18 based on information from the position sensors 17, b) compares the position R with a predetermined trajectory $R_0$ to determine, and c) feeds the deviation back to the robot actuators 16 so that the welding tip moves along the predetermined trajectory R₀.

Figure 2:
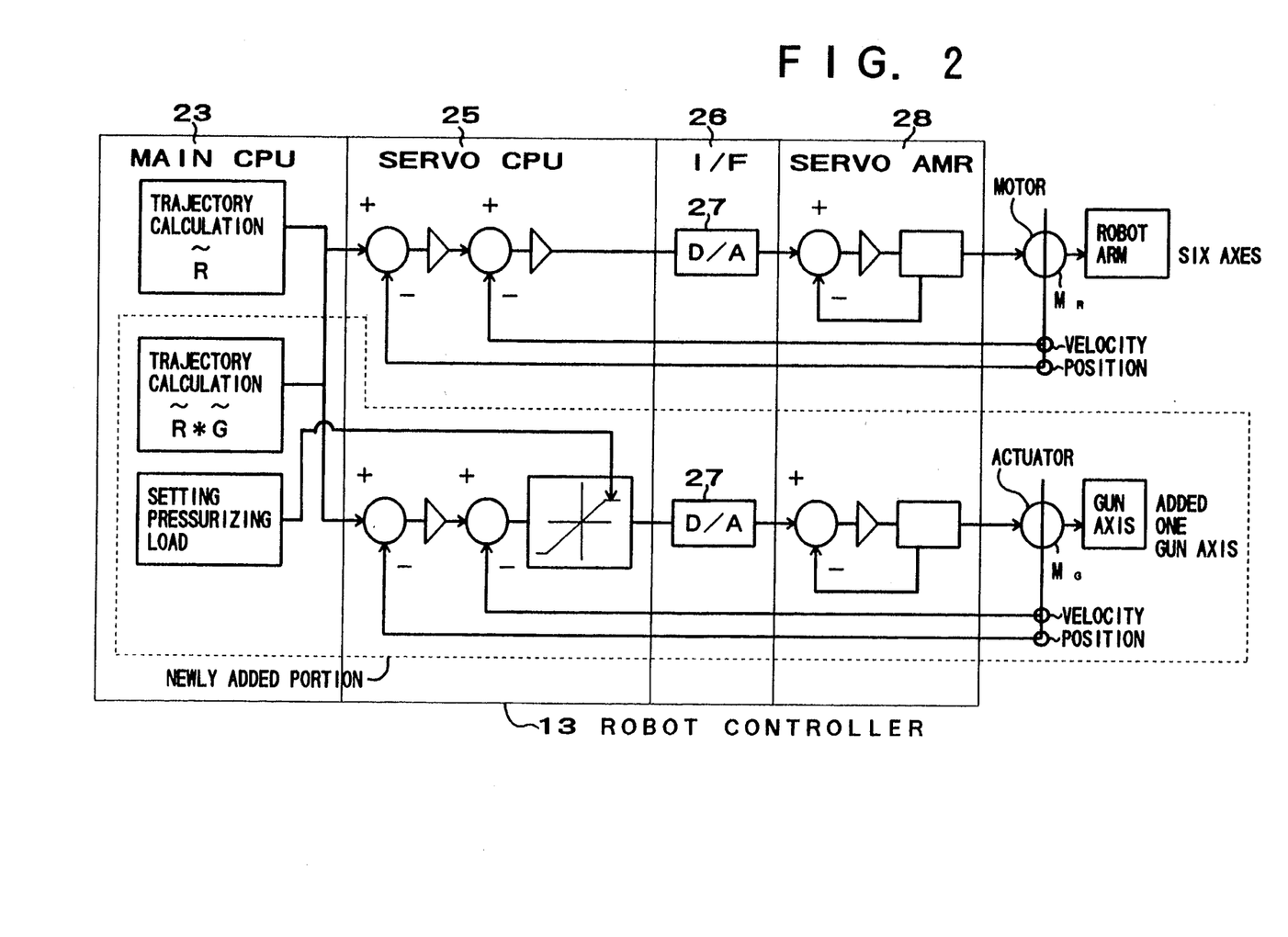
FIG. 2 is a block diagram of a control system of the apparatus of FIG. 1.

FIG. 2 illustrates the robot controller 13. The robot controller 13 has the CPU (a main CPU) 23, a servo CPU 25 electrically connected to the main CPU 23, an output interface 26, and a servo amplifier 28 electrically connected to each output interface 26. The output of each servo amplifier 28 is fed to a corresponding robot actuator 16 or gun actuator 19. The calculation of current position R*G and R of the welding tip 18 and the calculation of deviation of the current position from the predetermined trajectory R₀*G₀ and R₀ are conducted at the main CPU 23. The CPU 23 feeds an output as to what position each robot arm and welding gun should take to each servo CPU 25. At each servo CPU 25, the current position and speed of each robot arm and welding gun are compared with the output from the main CPU 23 and are controlled so that a deviation of the current position and speed of each robot arm and welding gun from the output from the CPU 23 is as small as possible and, as a result, the welding tip 18 is controlled to move along the predetermined trajectory.

In FIG. 2, a portion concerning the R calculation is a known portion, and an encircled portion concerning the R*G calculation is a new portion added in the present invention. The portion concerning the R calculation corresponds to a control of movement of the welding tip 18 driven by the robot actuators 16 only, after depressurization and before a successive pressurizing start signal is issued. The portion concerning the R*G calculation corresponds to a control of movement of the welding tip 18 driven by both the robot actuators 16 and the gun actuator 19, during pressurization and depressurization.

Next, an operation method of the above-described welding apparatus will be explained with reference to FIG. 4 and FIGS. 1-3, including steps of moving a welding tip 18 to a welding point where welding is conducted and then moving the welding tip to a successive welding point.

First, the welding tip 18 is moved toward a welding point. Before pressurization, the welding tip 18 is driven by the robot 11 only. During that time period, the gun actuator 19 is halted so that the welding tip 18 does not stroke relative to the gun body. During that time period, control of moving the welding tip 18 along the predetermined trajectory is conducted at the R calculation portion of FIG. 2.

When a pressurizing start signal is issued during the movement of the welding tip 18 toward the welding point, the robot 11 and the welding gun 12 begin to operate synchronously (or simultaneously) with each other and are controlled so that arrival of the welding tip 18 at the weld point and completion of pressurization coincide with each other. This control is conducted by operating both the R calculation portion and the R*G portion of FIG. 2.

During the simultaneous operation of the robot 11 and the welding gun 12, a position R*G of the welding tip 18 is calculated based on information G from the tip position sensor 20 of the welding gun 12 and information R from the position sensors 17 (17a, 17b, 17c, 17d, 17e, 17f) of the robot 11. The calculated position R*G is compared with the predetermined trajectory R₀*G₀ and stored in the RAM 24. The robot 11 and the welding gun 12 are controlled such that the deviation of the position from the trajectory is as small as possible and, as a result, the welding tip 18 moves along the predetermined trajectory R₀*G₀. Position is measured relative to a three-dimensional coordinate system having its origin at the robot base.

The reason why the position of the welding tip 18 can be expressed in the form of R*G is as follows:

With respect to the robot 11, a position of a first end of each robot arm relative to a second, base end of the robot arm can be determined by a column vector having four elements x, y, z, $\theta$, where $\theta$ is an articulation rotation angle at the second end. When the second end of the arm is pivotably connected to a first end of a second arm and the position of the first end of the first arm is expressed in the coordinates of the second arm, a four-by-four coordinate transformation matrix is necessary. This relationship holds with respect to all of the six arms one another. Therefore, to express the position of the hand (the gun mounting surface) of the six-articulation robot 11 in the three-dimensional coordinate system having its origin at the base end of the robot, a four-by-four coordinate transformation matrix R, which is a product of six four-by-four matrices each corresponding to adjacent two arms of the six arms, is necessary. Such four-by-four matrix R is known as Matrix of Denavit Hartenverg.

$$R = \begin{vmatrix} R_1 & R_2 & R_3 & x_R \\ R_4 & R_5 & R_6 & y_R \\ R_7 & R_8 & R_9 & z_R \\ 0 & 0 & 0 & 1 \end{vmatrix}$$

where, elements $x_R$, $y_R$, and $z_R$ are x, y, and z coordinates of the gun mounting surface and $R_1$–$R_9$ are vectors determined by directions of the gun mounting surface.

In the embodiment of the invention, the welding gun 12 is fixedly mounted to the gun mounting surface 14 of the robot 11. The welding gun 12 has a welding tip 18 which can stroke in one direction relative to the gun body. The movement of the welding tip 18 in one direction is taken as one one degree of freedom of the robot 11 and is controlled by the robot controller 13.

The position of the welding tip 18 (a column vector having four element, $x_G$, $y_G$, $z_G$, $\theta$) with respect to the coupling surface of the welding gun to the robot (which coincides with the gun mounting surface 14 of the robot after the welding gun is coupled to the robot) is expressed in a three-dimensional coordinate system having its origin at the gun mounting surface 14 using a four-by-four coordinate transformation matrix G.

$$G = \begin{vmatrix} G_1 & G_2 & G_3 & x_G \\ G_4 & G_5 & G_6 & y_G \\ G_7 & G_8 & G_9 & z_G \\ 0 & 0 & 0 & 1 \end{vmatrix}$$

where, elements $x_G$, $y_G$, and $z_G$ are x, y, and z coordinates of the welding tip and $G_1$–$G_9$ are vectors determined by directions of the welding tip, relative to the three-dimensional coordinate system having its origin at the coupling surface of the welding gun to the robot.

The position of the welding tip 18 can be expressed in the three-dimensional coordinate system having its origin at the robot base end using a four-by-four product matrix R*G. The matrix R*G is a matrix whose elements vary according to a point on the welding tip trajectory.

If an optimum trajectory for the welding tip from one welding point to a successive welding point is specified the matrix $R_0*G_0$ corresponding to the optimum trajectory is definitely determined. The matrix $R_0*G_0$ corresponding to the optimum trajectory is stored in the RAM. By controlling the robot actuator and the gun actuator such that a differential between the matrix $R*G$ and the matrix $R_0*G_0$, the actual trajectory of the welding tip 18 can be close to the predetermined optimum trajectory from a welding point to a successive welding point. If the optimum trajectory $R_0*G_0$ is predetermined such that pressurization and depressurization of the welding tip 18 by the gun actuator 19 are conducted during movement of the welding tip 18, the time periods $t_1$ and $t_2$ can be removed from the welding cycle time. Since $t_1$ is about 0.3 seconds and $t_2$ is about 0.2 seconds, the welding cycle time can be decreased by about ten seconds per one workpiece in a case where there are twenty weld points per one workpiece.

When the welding tip 18 reaches the welding point, the pressurizing has just finished. At the same time, the robot 11 is stopped, and the workpiece is spot-welded.

When the welding is finished, the robot 11 and the welding gun 12 are operated synchronously (or simultaneously) with each other so that movement of the welding tip 18 toward the successive welding point and depressurization of the welding tip 18 are conducted simultaneously with each other.

After depressurization, the welding tip 18 is moved by the robot 11 only until the successive pressurizing start signal is issued.

The above-described welding process will be repeated until welding at all the welding points is finished.

In accordance with the present invention, since the robot 11 and the welding gun 12 are operated synchronously with each other during a time period between an issue of a pressurizing start signal and finish of the pressurizing and during a time period between an issue of a pressurizing release signal and finish of the pressurizing release, the pressurization and depressurization time periods can be eliminated from the welding cycle time so that the welding cycle time is shortened.

Although only one embodiment of the invention has been described in detail above, it will be appreciated by those skilled in the art that various modifications and alterations can be made to the particular embodiment shown without materially departing from the novel teachings and advantages of the present invention. Accordingly, it is to be understood that all such modifications and alterations are included within the spirit and scope of the present invention as defined by the following claims.

What is claimed is:

1. An operation method of a welding apparatus, wherein the welding apparatus is provided with:
   a six articulation robot having an actuator for each articulation, a position sensor for each articulation, and a gun mounting surface formed at a tip of the robot;
   a welding gun mounted to the robot at the gun mounting surface and having a gun body, a welding tip movable relative to the gun body, a tip position sensor for detecting a position of the welding tip relative to the gun body, and a gun actuator for driving the welding tip relative to the gun body; and
   a robot controller electrically connected to the robot and the welding gun for controlling operation of the robot and the welding gun, said method comprising the steps of:
   (a) initially calculating a current position of the welding tip of the welding gun in a fixed space defined three-dimensional coordinate system having its origin at a base end of the robot by expressing a position of the gun mounting surface of the robot in the fixed space by a four-by-four matrix R which is based on information from all position sensors of the robot;
   (b) driving the welding tip toward a welding point by operating the robot;
   (c) upon issue of a pressurizing start signal during said driving of the welding tip, calculating the current position of the welding tip of the welding gun in the fixed space based on information from the tip position sensor of the welding gun and information from the position sensors of the robot in the robot controller;
   (d) comparing the calculated current position of the welding tip with a predetermined trajectory for the welding tip from a welding point to a successive welding point in the robot controller;
   (e) controlling the welding tip to move along the predetermined trajectory by simultaneous operation of both the robot and the welding gun so that arrival of the welding tip at the welding point and finish of pressurizing of a workpiece by the welding tip coincide with each other;
   (f) upon arrival of the welding tip at said welding point, stopping the robot and starting welding;
   (g) upon finish of said welding, operating again both the robot and the welding gun simultaneously with each other so that movement of the welding tip toward a successive welding point and depressurization of the welding tip are conducted simultaneously; and
   (h) upon finish of the depressurization, stopping operation of the welding gun and moving the welding tip toward a successive welding point.

2. A method according to claim 1, wherein said gun actuator comprises a servo motor and a ball screw for converting a rotation of the servo motor to a stroke motion of the welding tip, and said tip position sensor comprises an encoder coupled to the servo motor for detecting a rotation amount of the servo motor, and wherein a current position of the welding tip relative to the welding gun mounting surface of the robot is expressed using a four-by-four matrix G which is based on information from the tip position sensor.

3. A method according to claim 1, wherein a time period between an issue of a pressurizing start signal and the completion of pressurization is about 0.3 seconds, and a time period between an issue of a pressurizing release signal and the completion of depressurization in about 0.2 seconds.

4. An operation method of a welding apparatus, wherein the welding apparatus is provided with:
   a multi-articulation robot having a plurality of actuators, a plurality of position sensors, and a gun mounting surface formed at a tip of the robot;
   a welding gun mounted to the robot at the gun mounting surface and having a gun body, a welding tip movable relative to the gun body, a tip position sensor for detecting a position of the welding tip relative to the gun body, and a gun actuator for driving the welding tip relative to the gun body; and a robot controller electrically connected to the robot and the welding gun for controlling operation of the robot and the welding gun, said method comprising the steps of:

(a) driving the welding tip toward a welding point by operating the robot;

(b) upon issue of a pressurizing start signal during said driving of the welding tip, calculating a current position of the welding tip of the welding gun in a fixed space based on information from the tip position sensor of the welding gun and information from the plurality of position sensors of the robot in the robot controller by expressing the current position of the welding tip in the fixed space using a matrix product R*G of a first four-by-four matrix G defining a position of the welding tip relative to the gun mounting surface of the robot and a second four-by-four matrix R defining a position of the gun mounting surface of the robot in the fixed space;

(c) comparing the calculated current position of the welding tip with a predetermined trajectory for the welding tip from a welding point to a successive welding point in the robot controller;

(d) controlling the welding tip to move along the predetermined trajectory by simultaneous operation of both the robot and the welding gun so that arrival of the welding tip at the welding point and finish of pressurizing of a workpiece by the welding tip coincide with each other;

(e) upon arrival of the welding tip at said welding point, stopping the robot and starting welding;

(f) upon finish of said welding, operating again both the robot and the welding gun simultaneously with each other so that movement of the welding tip toward a successive welding point and depressurization of the welding tip are conducted simultaneously; and (g) upon finish of the depressurization, stopping operation of the welding gun and moving the welding tip toward a successive welding point.

5. A method according to claim 4, wherein said gun actuator comprises a servo motor and a ball screw for converting a rotation of the servo motor to a stroke motion of the welding tip, and said tip position sensor comprises an encoder coupled to the servo motor for detecting a rotation amount of the servo motor, and said calculating step is based on information from said encoder and said controlling step includes a step of controlling said servo motor.

6. A method according to claim 4, wherein a current position of the welding tip expressed using the four-by-four matrix R*G is compared with a predetermined trajectory for the welding tip expressed using a four-by-four matrix $R_0*G_0$, and a deviation of the current position of the welding tip from the predetermined trajectory is fed to the gun actuator and the actuators of the robot, so that the welding gun and the robot are operated synchronously.

7. A method according to claim 4, wherein a time period between an issue of a pressurizing start signal and the completion of pressurization is about 0.3 seconds, and a time period between an issue of a pressurizing release signal and the completion of depressurization is about 0.2 seconds.

8. An operation method of a welding apparatus, wherein the welding apparatus is provided with:

a multi-articulation robot having a plurality of actuators, a plurality of position sensors, and a gun mounting surface formed at a tip of the robot;

a welding gun mounted to the robot at the gun mounting surface and having a gun body, a welding tip movable relative to the gun body, a tip position sensor for detecting a position of the welding tip relative to the gun body, and a gun actuator for driving the welding tip relative to the gun body; and a robot controller electrically connected to the robot and the welding gun for controlling operation of the robot and the welding gun, said method comprising the steps of:

(a) initially calculating a current position of the welding tip of the welding gun in a fixed space by expressing a position of the gun mounting surface of the robot in the fixed space by a four-by-four matrix R which is based on information from all position sensors of the robot;

(b) comparing the calculated current position of the welding tip with a first predetermined trajectory;

(c) driving the welding tip toward a welding point by operating the robot alone so that the welding tip moves along the first predetermined trajectory;

(d) upon issue of a pressurizing start signal during said driving of the welding tip, calculating the current position of the welding tip of the welding gun in the fixed space based on information from the tip position sensor of the welding gun and information from the plurality of position sensors of the robot in the robot controller by expressing the current position of the welding tip in the fixed space using a matrix product R*G of a first four-by-four matrix G defining a position of the welding tip relative to the gun mounting surface of the robot and the four-by-four matrix R;

(e) comparing the calculated current position of the welding tip with a second predetermined trajectory;

(f) controlling the welding tip to move along the second predetermined trajectory by simultaneous operation of both the robot and the welding gun so that arrival of the welding tip at the welding point and finish of pressurizing of a workpiece by the welding tip coincide with each other;

(g) upon arrival of the welding tip at said welding point, stopping the robot and starting welding;

(h) upon finish of said welding, operating again both the robot and the welding gun simultaneously with each other so that movement of the welding tip toward a successive welding point and depressurization of the welding tip are conducted simultaneously; and (i) upon finish of the depressurization, stopping operation of the welding gun and moving the welding tip toward a successive welding point.

9. A method according to claim 8, wherein the first predetermined trajectory is expressed by a four-by-four matrix $G_0$ and the second predetermined trajectory is expressed by a four-by-four matrix $R_0*G_0$.

* * * * *

UNITED STATES PATENT AND TRADEMARK OFFICE
CERTIFICATE OF CORRECTION

PATENT NO. : 5,405,075
DATED : April 11, 1995
INVENTOR(S) : Narita et al

It is certified that error appears in the above-indentified patent and that said Letters Patent is hereby corrected as shown below:

ON THE COVER PAGE:
Reads:

[75] Inventors: Hideo Narita, Lexington, Ky.; Yoshitaka Sakamoto, Lichifield, United Kingdom; Hisanori Nakamura, Toyota, Japan; Yoichi Shibata, Toyota, Japan; Hiedaki Tobita, Toyota, Japan Should Read:

[75] Inventors: Hideo Narita, Lexington, Ky.; Yoshitaka Sakamoto, Lichifield, United Kingdom; Hisanori Nakamura, Toyota, Japan; Yoichi Shibata, Toyota, Japan; Hideaki Tobita, Toyota, Japan Signed and Sealed this Seventeenth Day of October, 1995

Attest:

BRUCE LEHMAN

*Attesting Officer*      *Commissioner of Patents and Trademarks*